July 1, 1930.  W. J. WHITING  1,768,814

METHOD OF REDUCING GLARE AND DAZZLE OF AN OPPOSING LIGHT

Original Filed Nov. 27, 1926  2 Sheets-Sheet 1

Inventor
WILLIAM J. WHITING,
By Spear, Middleton, Donaldson & Heel
Attorneys

July 1, 1930.  W. J. WHITING  1,768,814

METHOD OF REDUCING GLARE AND DAZZLE OF AN OPPOSING LIGHT

Original Filed Nov. 27, 1926  2 Sheets-Sheet 2

Inventor
WILLIAM J. WHITING,

Patented July 1, 1930

1,768,814

UNITED STATES PATENT OFFICE

WILLIAM J. WHITING, OF WASHINGTON, DISTRICT OF COLUMBIA

METHOD OF REDUCING GLARE AND DAZZLE OF AN OPPOSING LIGHT

Original application filed November 27, 1926, Serial No. 151,129. Divided and this application filed March 4, 1930. Serial No. 433,098.

This application is a division of my original application for Letters Patent for "Methods of producing a light effect" filed November 27, 1926, Serial No. 151,129.

The present invention is concerned with the application of light having a coordinated invisible spectral difference in new and useful ways of illuminating a scene which includes other opposing light having an undesirable effect. In the carrying out of this invention the inventor contemplates utilizing and applying, when desired or necessary, coordinated invisible spectral differences of an improved form, of his invention, wherein the different spectral compositions have the same center of gravity, one or more of the compositions include bright spectral bands separated by a dark band, and in cases where a plurality of compositions have the banded spectrum the coordination of the spectral positions of these bands in the respective compositions, whereby are obtained various desirable similarities of effect in conjunction with the use of objectively differing spectrums.

The general object of this invention is the satisfactory use of opposing radiation having a spectral difference but the same spectral center of gravity, while removing undesirable effects of the opposition, by selectively blocking the opposing radiation. As limited to visual radiation, the general object of the invention is the satisfactory illumination of a scene which includes opposing illumination or light, with the simultaneous reduction of undesirable effects of the opposing light, especially as applied to illuminating a scene by one light, while reducing or excluding the glare and dazzle of another light exposed in the scene, or while reducing or excluding the opposing light, both the satisfactory illuminating light and the opposing light being subjectively substantially of the same color, requiring the same physiological focus, and in general having the same subjective effect, this useful object being accomplished by illuminating the scene with light having as complete as desired an invisible spectral difference from the opposing light, and restricting the light reaching the observer's eye to light of the spectral composition of his illuminating light.

Another object of this invention is, while illuminating a scene, object, screen or the like from opposite directions by the projection of two separate beams of light, to reveal the scene from opposing view points respectively as illuminated by subjectively white light, or by light subjectively of the same certain color, at the same time preventing all, or an undesirable proportion or part of the light composing or originating one beam of light reaching the eye of an observer choosing to utilize the other beam, this useful effect being accomplished by projecting two beams having an invisible spectral difference, and interposing between the scene and the observer's eye a light filter transmitting light only of the beam the observer chooses to utilize. Obviously, among other opposing scenic effects this object of invention includes the application to opposing automobile headlights, and to opposing searchlights on boats or airplanes, or to opposing lights on any type of vehicle, or in a stationary position, and to opposing light or images projected on the same scene or screen from opposing directions.

Another object of my invention is to reduce for an automobile driver the glare of an opposing headlight having an ordinary continuous spectrum, while satisfactorily illuminating a road by light of a desired color, or of no chromatic color, by restricting the spectral composition of the said driver's headlight to include bright bands separated by a dark band, while maintaining in the said driver's headlight the spectral center of gravity and hue of ordinary light of the said desired color, or absence of chromatic color, having a continuous spectrum, and restricting the light reaching the said driver's eye to light of the said restricted banded spectral composition, thus reducing the opposing headlight inasmuch as the said dark bands lie within its continuous spectrum. The method is obviously applicable to opposing lights on any type of vehicle, or in a stationary position, whether used to illuminate or to project light or images in light.

Another object of my invention is in applying a method, to include in the coordination of the subjectively similar spectral compositions having an objective difference a secondary coordination with the spectral composition of certain light features, such as a red rear light, or green or orange signal lights, which are or may appear in the scene, and which it is desirable to make available simultaneously to two opposing observers using my objectively different light of coordinated compositions, by delimiting a respective bright band in each said objectively different spectral composition with respect to the spectral composition of one or more of said certain light features so that a suitable portion, which may be the same portion or a different portion, of the latter composition may be included in the light reaching each observer's eye, and so including it. Thus chromatic effects common to both observers are obtained simultaneously with the segregation of a diminishing effect on opposing glare.

Another object of my invention is to make a choice of one of two coordinated lights having the same spectral center of gravity available to an observer, while making available at the same time a choice of one of two restricting elements, by incorporating suitable light-selective elements in any of the well known suitable mechanisms.

Another object of my invention is to make available to an observer a choice of a plurality of images projected on a scene from opposing directions, by projecting the respective images in objectively different light having the same hue and spectral center of gravity, and restricting the light reaching the observer's eye to the chosen one of the objectively different compositions by means of a suitable selective element.

In carrying out my invention as above described I contemplate the production of light of definite predetermined wavelengths and energy distribution by any suitable method, and likewise to utilize suitable selectively reflecting or selectively transmitting filters, or any suitable selective element to restrict the light reaching the eye. I further contemplate the manufacture of suitable filters, and apparatus for utilizing the same.

I have illustrated in the drawings certain diagrams as an aid to a better understanding of my invention, in which.

Figure 1:
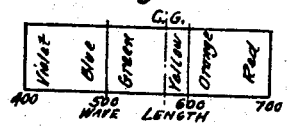
Figure 1 is a diagram of the visible continuous spectrum of ordinary white light, the position and wavelengths of the six principal colors being indicated. The spectral center of gravity is at CG.
Figure 2:
Fig. 2 shows the spectrum of a light from which the spectral green rays are absent.
Figure 3:
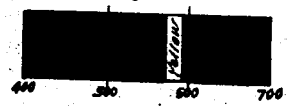
Fig. 3 shows the spectrum of a light composed of substantially spectral yellow rays only.
Figure 4:
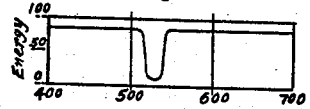
Fig. 4 is a diagrammatic energy graph of the spectrum shown in Fig. 2.
Figure 5:
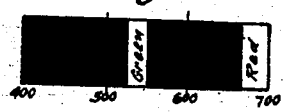
Fig. 5 shows the spectrum of a physiological yellow light which appears to an observer identical with the light composed of spectral yellow shown in Fig. 3.
Figure 6:
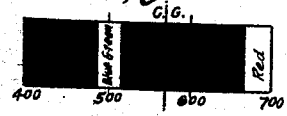
Fig. 6 shows the spectrum of a light which appears white to an observer, i. e. is a physiological white. The spectral center of gravity is at CG.
Figure 8:
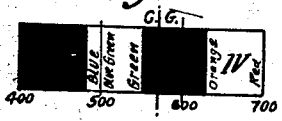
Fig. 8 and Fig. 10 show the spectrums of two physiological whites having an invisible complete spectral difference. The center of gravity of each spectrum is at CG.
Figure 10:
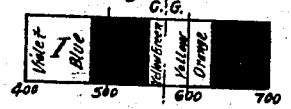
Figure 12:
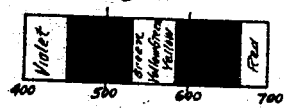
Figure 14:
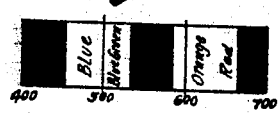

An invisible partial spectral difference is shown by pairing Figs. 8 or 10 with Figs. 1, 12 or 14.

Fig. 12 and Fig. 14 show another pair of physiological whites having an invisible complete spectral difference, but a common chromatic effect in red.

Figure 9:
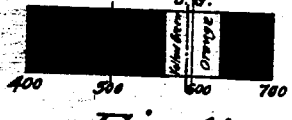
Figure 11:
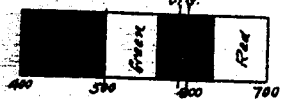

Fig. 9 and Fig. 11 show the spectrums of two physiological yellows with an invisible complete spectral difference. The center of gravity of each spectrum is at CG.

Figure 13:
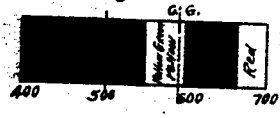
Figure 15:

Fig. 13 and Fig. 15 show the spectrums of another pair of physiological yellows having an invisible spectral difference. The center of gravity of each spectrum is at CG.

Figure 16:
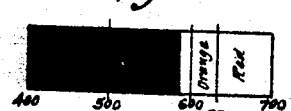

Fig. 16 shows the continuous spectrum of ordinary physiological red, any part from 630 millimicrons to 700 mm. being spectral red.

Figure 17:
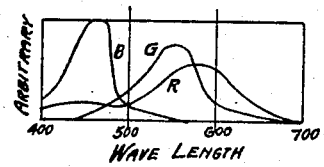

Fig. 17 is a diagrammatic graph showing the relative effect on the different color sensations by rays of different wavelength. The blue, green and red curves are indicated respectively by B, G, and R.

Figure 18:
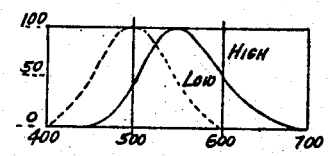

Fig. 18 is a diagrammatic graph showing the relative luminosity of different wavelengths at the same energy. The continuous line applied for high luminosities, the broken line for low luminosities.

Figure 19:
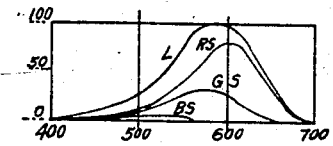

Fig. 19 is a diagrammatic graph showing the red, blue and green sensation curves in terms of luminosity.

Figure 20:
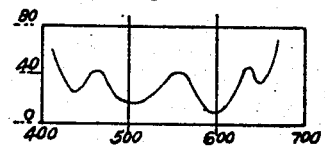

Fig. 20 is a diagrammatic graph showing the wavelength increments necessary for discrimination of hue difference of spectral colors. Abscissas are wavelengths, ordinates are wavelength changes required to cause hue difference.

Figure 21:
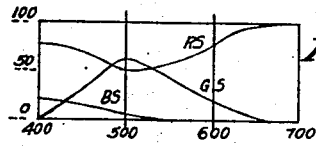

Fig. 21 is a diagrammatic graph showing the per cent of red, green and blue sensations in spectral colors in terms of luminosity.

Figure 22:
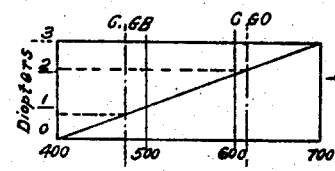

Fig. 22 is a diagrammatic graph showing the difference in ocular focus required for difference spectral colors. The spectral center of gravity of blue of Fig. 25, and orange of Fig. 26, are shown respectively by CGB and CGO.

Figure 23:
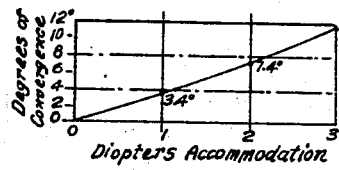

Fig. 23 is a diagrammatic graph showing the change in convergence of the eyes normally to be expected from changes in required focus, assuming no convergence required at relaxed accommodation.

Figure 24:
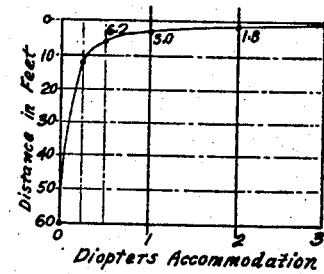

Fig. 24 is a diagrammatic graph showing the focus, or accommodation normally required and associated with various distances.

Figure 25:
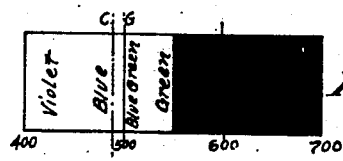
Figure 26:
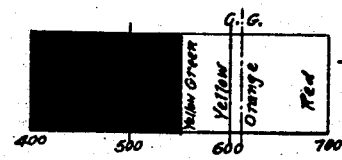

Fig. 25 is a diagrammatic spectrum representing the composition of ordinary blue. CG shows the center of gravity of the composition.

Fig. 26 shows the composition of ordinary orange, and its center of gravity at CG.

Figure 27:
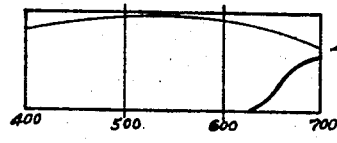

Fig. 27 shows diagrammatic spectrophotometric curves of the spectral compositions of two illuminants, the light line representing daylight, the heavy line a red light differing from daylight in hue, luminosity, center of gravity, and required focus.

Figure 28:
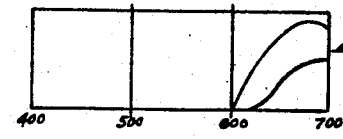

Fig. 28 shows the spectral compositions of two red illuminants, indicated by the light and heavy line respectively, which have the same subjective hue, but differ in luminosity, center of gravity and required focus.

Figure 29:
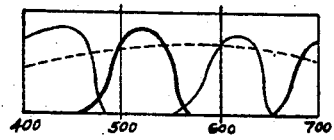

Fig. 29 shows the spectral compositions of three illuminants each of which appears white to an observer, and has substantially the same luminosity, center of gravity and required focus, a light broken line representing daylight, a light unbroken line and a heavy line indicating respectively two compositions consisting each of two bright bands separated by a dark band.

Figure 30:
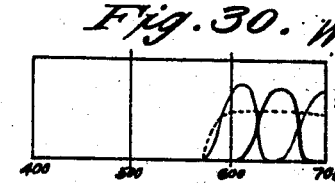

Fig. 30 shows the spectral composition of three red illuminants which have the same subjective hue, center of gravity, required focus, and luminosity.

Figure 7:
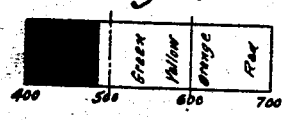
Fig. 7 shows the continuous spectrum of ordinary physiological yellow light, such as is reflected by ordinary yellow dyes, pigments, and the like in daylight or substantially as given by a tallow candle, but which appears to an observer identical with the yellows shown in Figs. 3 and 5 respectively.

It is well known that ordinary white light is composed of light of all visible wavelengths and has a continuous spectrum as shown in Fig. 1, in the light line of Fig. 27, and the broken line of Fig. 29, and that if certain wavelengths are missing or weaker, leaving a dark space in the spectrum, colored light results such as yellow in Fig. 7, red in Fig. 16, and both curves of Fig. 28, and of Fig. 30, blue in Fig. 25, and orange in Fig. 26. Denoting the colors as seen in the spectrum as "spectral colors", of especial importance to my invention is the fact, that ordinary colors and white are composed of a plurality of spectral colors as indicated in the diagrammatic figures. In this application these colors made up of wavelengths comprising a plurality of spectral colors will be denoted "physiological colors".

Likewise of especial importance to my invention is the fact that the relative or the actual energy at each wavelength in the spectrum of a given light may be measured on a spectrophotometer and recorded qualitatively and quantitatively as shown in Fig. 4, and Figs. 27 to 30 inclusive; hence this spectral composition of a light exists objectively as a definite relation between energy and wavelength independently of its effect upon an observer, and objectively completely describes and determines the light.

While objective identity of lights connotes identity of their spectral compositions, subjective identity of lights does not connote identity or even similarity of spectral compositions; lights which are objectively very different, that is, have a partly or entirely different composition, may appear identical to an observer. In other words, such lights have an invisible spectral difference. Such subjective identity with an invisible spectral difference is shown in Figs. 1, 6, 8, 10, 12, and 14, each of which affects an observer as white, while Figs. 3, 5, 7, 9, 11, 13, and 15, each affects an observer as yellow.

It is also well known that any stimulus which affects the fundamental color sensations, shown for the trichromatic theory in Fig. 17, and also in Figs. 19 and 21, in a given proportion and intensity causes the same color sensation regardless of the actual wavelengths involved in the stimulus; and that the luminosity, or brightness, of the resultant sensation, being subjective, does not vary directly as the energy of the radiation, the same energy at different wavelengths resulting in different luminosities, and the ratio being different for different wavelengths, as shown in Fig. 18.

In determining what sensation will result from a certain spectral composition each part of the spectrum has a certain weight according to its energy position relative to the luminosity curve and relative to the red, green and blue sensation graph, &c., so that the spectral position which divides the total utilized weights equally may be called the center of gravity of the weights or of the spectral composition. By the term "spectral center of gravity" I mean to include the centroid defined as $$\lambda_c \frac{\int_0^\infty V_\lambda E_\lambda \lambda d\lambda}{\int_0^\infty V_\lambda E_\lambda d\lambda}$$

where $\lambda$ = wavelength
$V_\lambda$ is relative visibility
$E_\lambda$ is energy per unit wavelength the two last being functions of wavelength, $\lambda$.

In graphic terms accurately the spectral center of gravity is the "center of gravity" of the area included between the "luminosity curve" (Fig. 18 of my application) and the wavelength axis, the centroid being the co-ordinate of the center of gravity. The term by usage may mean the actual center of gravity of area in terms of the two coordinates, or, more usually refer to the $\lambda$ coordinate, or centroid. In addition I mean to include not only the above defined centroid and all compositions in which a definite balance of utilized dependent variables can be expressed as a certain wavelength, but also secondarily broadly to cover a spectral distribution in which certain dependent variables are balanced to a predetermined proportion. Then, any two spectral distributions which include these variables in the same predetermined proportion may be said to have the same spectral center of gravity in relation to these variables, even though the centroids, as defined above, be different. Thus I may wish to coordinate two compositions with relation to the hue discrimination curve, Fig. 20, so as to get an equal effect by an equal shift of either composition, or secure the same sensitivity to shift in each.

The term spectral center of gravity is important in this application because not only do similar hues at the same luminosity have the same centroid, but lights having the same centroid require approximately the same ocular focus, i. e., the term spectral center of gravity determines and indicates the effect of the whole spectral composition.

Of importance to applications of my invention are the facts that a physiological color may be matched by physiological color of several entirely, or, if desired, partly different spectral compositions; that the continuous bright spectral band or bands of ordinary light or color can be replaced by two or more suitably chosen narrower bands separated by a dark band without altering the color of the light; and that two compositions of the latter type may be produced in which the bright bands of one occur in the spectral positions occupied by the dark bands of the other, i. e., alternate in the two spectra.

Obviously this manner of division of spectral composition makes it possible to design two or more spectral compositions having a common center of gravity, or an equal distribution relative to the respective color sensation curves, or to the luminosity curve, or, in general, relative to curves such as shown in Figs. 17 to 22 inclusive or the like, or to a desirable compromise between several effects. It is of peculiar importance to certain applications of my invention that in certain cases two or more spectral compositions can be designed which have at the same time the same color effect, the same luminosity, and the same effect in ocular focus, and other desirable effects.

I will now explain my invention in detail by some examples showing its utility and novelty.

As a method of reducing glare, providing different spectral compositions for opposing lights and selectively restricting the light reaching each observer's eye is well known. Perhaps its best form of exclusive difference with the approximate positions of the centers of gravity is shown in Figs. 25 and 26, the colors in general being complementary, or described as being so. Besides the disagreeable color effect and the poor visibility in blue due both to the lack of contrast and increase of scattering by haze or dust, blue is an especially tiring illumination, even injurious, when as is common, a proper physiological focus is difficult or impossible at a distance in light of that color for a person whose eyes are corrected by glasses, or possess full complement. Moreover, because of the difference in position of their centers of gravity the focus required for the same distance in the two colors is distinctly different, from about one diopter with the best form, to nearly two diopters in a poor choice of spectral division. The extent of this effect of the well known lack of achromatism of the eye is shown in Fig. 22.

This difference of focus is especially dangerous from the automobile driver's standpoint because, as shown in Fig. 23, the convergence requirements differ for the two foci, that is, at the same distance a change of light by requiring a different focus automatically changes or tends to change the convergence between the eyes, and this convergence effect is interpreted subjectively as a change in the apparent distance of the object looked at. A change of one diopter may stimulate a convergence change of 4° in angle which is equivalent to many feet in distance. In the close passage of rapidly moving automobiles even a slight tendency to misjudge distance is a material danger. Even when, as is the best usage, such opposing lights are not exclusive, but are simply tinted to subdue the opposing light only in part and to a desired amount, the tendency to misjudge distance is still present to a dangerous degree, and the other defects likewise.

In addition, some colored signal lights are more or less completely dimmed by one of the selective filters, and even when the selectivity is not exclusive the opposing tints affect orange, yellow, green or blue very disproportionately. There being but one spectral boundary between the spectral compositions of the two illuminations there is little opportunity for coordination, except that of a natural duplication in red due to a peculiarity of dyes.

The type of spectral difference shown in Fig. 27, or the so-called invisible spectral difference shown in Figure 28, is obviously even more unsuitable for the objects of my invention.

By utilizing opposing lights having a suitable invisible spectral difference these defects are largely removed. By utilizing the coordinate light of my invention having an objective difference but a subjective similarity and the same spectral center of gravity, and including bright bands separated by a dark band, coordinated so that bright bands of one spectrum have the spectral position of the dark bands of the opposing light, all the defects of the prior art completely disappear. The lights are of the same color, and they require the same ocular focus when used on an ordinary scene, ordinary objects appear substantially in their natural colors, and at the same distance, with either light. There is good visibility and no eyestrain in driving, and no shock or changed conditions upon changing, and, of course, no danger. The opposing lights can be coordinated to produce any amount of exclusion desired, moreover, because of the flexibility of design and manner of coordination of the spectral compositions made available by the banded structure, all expected signal colors can be made clearly visible and distinguishable while maintaining the similarity and segregation of the opposing illuminations; for not only does the number of bands make it almost certain that some signal spectra will be divided suitably, but the number makes it possible to situate one or more band boundaries especially relative to one or more signal spectra, and shift others to maintain the desired center of gravity. That this is so follows directly from the characteristics of the light of my invention as described and discussed above. There being no change or difference of color, or of spectral center of gravity, there is no difference of focus, no change of focus, or change of convergence, or tendency to change convergence. Both drivers can use white light, or light of any hue agreed upon, or light of the most desirable or suitable color; for instance, in Figs. 8 and 10, or in Figs. 12 and 14, or two yellows as shown in Figs. 13 and 15.

In carrying out my invention as above described, I contemplate the production of light of definite, predetermined wavelengths and energy distribution, such for instance as is illustrated in Figs. 5, 6, 8, 9, 10, 11, 12, 13, 14, and 15, and Figs. 29 and 30, by any suitable method, such as by selection of a light source giving of itself the desired bright line or band spectrum, or by utilizing any suitable light source of continuous, or known spectrum, and actually forming its spectrum, and, after blocking out the undesired wavelengths, recombining the light, or by utilization of a selective filter or filters in cooperation with a suitable light source. Such a filter may be selectively transmitting or selectively reflecting, and an object or scene or part thereof may itself serve as the filter. Likewise an object or scene may be in effect the light source.

I further contemplate in carrying out my invention the utilization of selectively transmitting or reflecting filters for the revelation of the subjective differences in effect of the two coordinated spectral compositions, and, where desirable, to use an illuminated object or a part of the scene as the filter. Any certain filter may be compounded of two or more cooperative or coordinated units.

I intend to utilize any suitable selectively transmitting or reflecting material for the above filters, necessary or desirable, either transparent, translucent or opaque, such as colored or flashed glass, glass holding selective absorbing material in solid solution, stained or dyed gelatin, collodion or the like, supported or unsupported by a transparent backing, such as glass, mica, celluloid, or the like, or placed or cemented between such transparent supports, or thin films of transparent pigments or dyes, liquid, chemicals or solutions of inorganic or organic materials in cells, surfaces especially covered with thin or thick layers of pigments, dyes, lakes, inks, or the like, or natural objects and surfaces.

However, I have found that the class of coal tar dyes are peculiarly suitable for the making of transparent filters when used as a stain for gelatine, collodion or the like, or in solution, and also for the formation of reflecting filters, the dye being used either as stain or in the form of lakes. Such dyes enable one skilled in the art to prepare filters limiting light to any desired spectral composition both as to wavelengths, and with the minimum loss of light, with the utmost precision, and permit delicate correction for light source, or other purposes. I have fully disclosed the desired manner of apportioning the spectrum. The particular dyes, &c., to be utilized obviously must depend upon the particular variation of a method chosen from among the several variations disclosed in the specification, and covered by the claims.

Obviously a separate unit can be used for each dye if desired. In certain cases, especially where single components of a composition are utilized separately, I find that colored glass units may be utilized with advantage singly or in combination. Also, a stained film can be backed by a suitably colored glass or other material if desired. In other cases it is desirable to have either a partial or complete invisible spectral difference in the light sources, by utilizing, for example, a mixture of two or more salts to match the flame coloration caused by another salt.

In the claims, by "scene" I mean anything, whether natural or artificial, which can be illuminated, or upon which light is or can be projected from differing directions.

Where I use the word "projection," I mean to include what is well known in the art as opaque or solid projection, obviously ordinary photography involves opaque projection, as does ordinary vision wherein ordinary objects are projected upon the retina. Further, I use "projection" to describe the control of the direction of light radiation, reserving the term "illumination" for use when I wish to use radiation uncontrolled in direction. Light radiating under the inverse square law is "projected" light if the size of the light source can be neglected in the manner the light source is utilized: for example, the outline of an object, silhouette, or a transparency, can be projected by simply placing said object or transparency in the path of light radiating from a relatively small source: i. e., projection is not confined to the action of a lens or reflector. Obviously many effects obtained by illumination can also be obtained by projection, and many effects of projection can also be obtained by illumination, but not all. It is evident that "projected" light must illuminate, hence, in the claims, "projection" includes "illumination" as well; likewise the term "illumination" in the claims may include illumination by projection where that connotation is effective in the procedure of the claim: therefore in the claims, "projection" and "illumination" may each include the other, the distinction in use being confined to the clarification of the procedure.

As shown above, the element cooperating with the light source to produce light having the desired characteristics may not actually "filter," or such element may be a property of the light source, so that in the claims where I use the expression "character imparting element," I mean any device which will impart the desired character to the light. Likewise, the revealing filter does not necessarily include an actual "filtering" action, so that in the claims where I refer to a "revealing filter" I mean any means whereby the desirable subjective differences in effect of the two coordinated spectral compositions may be revealed, whether by filtration or not.

By dark spectral bands I mean bands dark enough to cause the desired effect This may require complete absence of light, or only a relative darkening compared to the bright bands.

When two lights have the same hue and spectral center of gravity but an objective spectral difference, I mean to include, where it is desirable in the procedure, a sufficiently distinguishable difference of hue to make each light recognizable as different without test by a revealing filter.

I claim:

1. The method of producing a visual effect which includes the steps of illuminating a scene simultaneously from opposing directions respectively by light having an invisible difference of spectral composition, and, at will, restricting, by means of a suitable filter, the light reaching the eye to light of wavelengths substantially included in but a chosen one of said spectral compositions.

2. The method of producing a visual effect which includes the steps of illuminating a scene simultaneously from opposing directions respectively by light having an objective difference of spectral composition, but having substantially the same spectral center of gravity, and, at will, restricting, by means of a suitable filter, the light reaching the eye to light of wavelengths substantially included in but a chosen one of said spectral compositions.

3. The method of producing a visual effect which includes the steps of illuminating a scene simultaneously from opposing directions respectively by light having an objective difference of spectral composition, but having substantially the same spectral center of gravity, each said spectral composition consisting of bright spectral bands separated by a dark band, the bright bands of each one of said compositions occupying substantially a position included only in dark bands of the other said compositions, and, at will, restricting, by means of a suitable filter, the light reaching the eye to light of wavelengths substantially included in but a chosen one of said spectral compositions.

4. The method of producing a visual effect which includes the steps of illuminating a scene simultaneously from opposing directions respectively by light having an objective difference of spectral composition, but having substantially the same color, each said spectral composition consisting of bright spectral bands separated by a dark band, the spectral position of the bright bands of one said composition occupying substantially the spectral position of the dark bands of the other said composition and at will restricting, by means of a suitable filter, the light reaching the eye to wavelengths substantially included in but a chosen one of said spectral compositions.

5. The method of producing a visual effect which includes the steps of illuminating a scene simultaneously from opposing directions respectively by light having an objective difference of spectral composition, but having substantially the same spectral center of gravity, said scene including certain light features each having respectively a certain predetermined subjective color, the spectral composition of each said subjective color being known, restricting, at will, by means of a suitable filter, the light reaching the eye substantially to a spectral composition including only the spectral compositions of a certain selected number of said subjective colors and a chosen one of said objectively different compositions.

6. The method of producing a visual effect which includes the steps of illuminating a scene simultaneously from opposing directions respectively by light having an objective difference of spectral composition, but having substantially the same spectral center of gravity, said scene including certain light features each having respectively a certain predetermined subjective color, the spectral compositions of said illuminating light including in common a certain same portion of each of said spectral compositions respectively of said subjective colors, the light respectively of the said spectral portions so included from each of said subjective colors being of itself substantially of said subjective color, and at will restricting, by means of a suitable filter, the light reaching the eye to light included substantially only in a certain selected number of said included common spectral portions and the remainder of but a chosen one of said spectral compositions of said illuminating light.

7. The method of producing a visual effect which includes the steps of illuminating a scene simultaneously from opposing directions respectively by light having an objective difference of spectral composition, but having substantially the same spectral center of gravity, each said spectral composition consisting of bright spectral bands separated by a dark band, the bright bands of each one of said compositions occupying substantially a position included only in dark bands of the other said compositions, the spectral position of said bands being also coordinated with certain secondary other known predetermined spectral compositions, said secondary spectral compositions being the predetermined compositions respectively of certain colors known to occur at times in said scene as valuable light features, said secondary compositions respectively each being partly included in and including a part of a respective bright band of each said objectively differing composition, the said bright bands involved in any certain said respective secondary composition being spectrally contiguous and their separating boundary being included in said respective secondary composition, the light of the part of each respective said secondary composition included in each respective said objectively differing composition having a distinguishing similarity to said respective subjective color, and, at will restricting, by means of a suitable filter, the light reaching the eye to light of wavelengths substantially included in but a chosen one of said spectral compositions.

8. The method of producing a visual effect which includes the steps of illuminating a scene simultaneously from opposing directions respectively by light having an objective difference of spectral composition, but having substantially the same spectral center of gravity, one said spectral composition consisting of bright bands separated by a dark band, said spectral compositions having substantially no wavelengths in common, said scene including certain light features each having respectively a certain predetermined subjective color, the spectral composition of each said subjective color being known, said objectively different spectral compositions of said illuminating light being coordinated with the said spectral compositions respectively of the said light features, neither of the said spectral compositions of the said illuminating light including substantially any wavelengths included in any of said spectral compositions respectively of said light features, and at will, restricting, by means of a suitable filter, the light reaching the eye to a spectral composition including only the spectral compositions of a certain selected number of said light features and a chosen one of said compositions of said illuminating light.

9. The method of increasing the visibility of a scene wherein are situated lights opposed to the observer which cause glare and dazzle, said lights having a known spectral composition consisting substantially of a continuous spectrum, which includes the steps of illuminating said scene by a special light screened from the observer, said special light having a predetermined spectral composition including a plurality of bright bands separated by a dark band, said special light having substantially the same spectral center of gravity, and hue, as said lights consisting of a continuous spectrum, restricting the light reaching the eye substantially to wavelengths comprised in the said spectral composition of said special light, by means of a suitable filter placed between said scene and the observer, the reduction of brightness of the said lights of continuous spectrum to any predetermined extent being treated as a function of and being substantially controlled by the relative predetermined proportionate part the dark bands occupy of the spectrum of the said special light, as evaluated by reference to the relative luminosity of different wavelengths at the same energy, whereby said dazzling lights are dimmed a predetermined amount while said scene is otherwise substantially unchanged in appearance.

10. The method of increasing the visibility of a scene wherein is situated a light opposed to the observer and causing glare and dazzle, which includes the steps of restricting said light, by means of a filter suitably placed between said light and the observer, to light of a predetermined known spectral composition, said composition including a plurality of bright bands separated by a dark band, illuminating said scene by means of a second light screened from the observer, the said second light having a spectral composition including substantially only wavelengths not included in the said restricted composition of the first said light, said compositions of said lights having substantially the same spectral center of gravity, and hue, restricting the light reaching the eye substantially to wavelengths comprising the spectral composition of said second light, whereby the first said light is practically excluded while said scene remains illuminated in full brightness by said second light.

11. The method of illuminating a scene simultaneously from opposite sides by subjectively similar light while protecting an observer on either of said sides of said scene from the glare of the said light illuminating the scene from the opposing side, which includes the steps of providing two lights, cooperating each light with a character imparting element by placing said element between said light and said scene, after such cooperation each of said lights having a predetermined spectral composition coordinated with the spectral composition of the other said light, each of the said compositions consisting substantially of a plurality of bright spectral bands separated by a dark band, the bright bands of one said composition occupying a spectral position included substantially only in the spectral position of the dark bands of the other said composition, said spectral compositions having substantially the same center of gravity, the same hue, and brightness, further cooperating said lights with a revealing filter placed between said observer and said scene, transmitting freely substantnially all wavelengths in the light on said observer's side, but excluding to any desired extent all wavelengths of the opposing light.

12. The method of reducing glare from an opposing automobile headlight having an ordinary continuous spectrum, which includes the steps of providing a filter for the headlights of the observer's automobile, said filter having a predetermined selective transmission coordinated with the spectral composition of said observer's headlight, said filter having a known coefficient of absorption, the selective transmission of said filter for said observer's headlight having a predetermined restricted spectral composition including substantially the same spectral center of gravity, and hue, as said observer's headlight, and including bright spectral bands separated by a dark band, said restricted spectral composition including certain predetermined wavelengths also included in the known spectra respectively of red, yellow, green, and any other predetermined signal lights, the light so included in common with said signal light spectra being distinguishable, when isolated, as respectively said signal colors, said observer's headlight having a certain predetermined brightness, said brightness cooperating with the light transmission of the said filter, and placing said filter before said observer's headlight, whereby said headlight is lent said restricted spectral composition, said restricted observer's headlight having a certain predetermined brightness, and further providing a revealing filter, said revealing filter having substantially the same spectral transmission as said headlight filter, and placing said revealing filter before the observer's eye, whereby the light reaching the observer's eyes is restricted substantially to light of wavelengths included in said observer's headlight, and observing the road fully illuminated by said observer's restricted headlight and of normal appearance, observing said signal lights as distinguishable, observing the said opposing headlight materially reduced in brightness, while the opposing driver utilizing the said opposing headlight finds his own headlight illumination normal, but the dazzle and glare from the said observer's restricted headlight materially reduced from that which would be caused by the said observer's headlight without said restriction.

13. The method of reducing glare from an opposing automobile headlight having an ordinary continuous spectrum, which includes the steps of providing a filter for the headlights of the observer's automobile, said filter having a predetermined selective transmission coordinated with the spectral composition of said observer's headlight, said filter having a known coefficient of absorption, the selective transmission of said filter for said observer's headlight having a predetermined restricted spectral composition including a predetermined spectral center of gravity, and hue, and including bright spectral bands separated by a dark band. said restricted spectral composition including certain predetermined wavelengths also included in the known spectra respectively of red, yellow, green, and any other predetermined signal lights, the light so included in common with said signal light spectra being distinguishable, when isolated, as respectively said signal colors, said obeserver's headlight having a certain predetermined brightness, said brightness cooperating with the light transmission of the said filter, and placing said filter before said observer's headlight, whereby said headlight is lent said restricted spectral composition, said restricted observer's headlight having a certain predetermined brightness, and further providing a revealing filter, said revealing filter having substantially the same spectral transmission as said headlight filter, and placing said revealing filter before the observer's eye, whereby the light reaching the observer's eyes is restricted substantially to light of wavelengths included in said observer's headlight, and observing the road fully illuminated by said observer's restricted headlight and of normal appearance, observing said signal lights as distinguishable, observing the said opposing headlight materially reduced in brightness, while the opposing driver utilizing the said opposing headlight finds his own headlight illumination normal, but the dazzle and glare from the said observer's restricted headlight materially reduced from that which would be caused by the said observer's headlight without said restriction.

14. The method of reducing the glare from the opposing headlights of two automobiles, which includes the steps of providing said automobiles respectively with headlights having coordinated objectively different spectral compositions, but having substantially the same spectral center of gravity, and substantially the same color, one of said compositions consisting of a plurality of bright bands separated by a dark band, said compositions having substantially no bright portions in common, the bright portion of each said composition including a certain predetermined portion of the predetermined known spectrums of certain selected colored signal lights, the light of the said included portion of each said signal light spectrum being distinguishable as said signal color, providing each observer with a selective filter, said filters being different, restricting the light reaching each respective observer's eye substantially to the spectral composition of his own headlight, but transmitting that with substantially no loss, by placing a suitable one of said filters between said observer's eye and the opposing headlight.

15. The method of reducing the glare from the opposing headlights of two automobiles, which includes the steps of providing said automobiles respectively with headlights having coordinated objectively different spectral compositions, but having substantially the same spectral center of gravity, and substantially the same color, one of said compositions consisting of a plurality of bright bands separated by a dark band, said compositions being coordinated with the known predetermined spectra respectively of certain colored signal lights, said compositions having substantially no bright portions in common except a certain selected portion respectively of each of said signal spectra, the light of the said selected portions, when isolated, being distinguishable as said respective signal color, providing each observer with a selective filter, said filters being different, restricting the light reaching each respective observer's eye substantially to the spectral composition of his own headlight, but transmitting that with substantially no loss, by placing a suitable one of said filters between said observer's eye and the opposing headlight.

16. The method of reducing the glare of opposing automobile headlights which includes the steps of providing each of a plurality of automobiles with a headlight character imparting element, said element including a pair of light filters each having a different selective absorption for its headlight, and each having substantially a completely different selective transmission for its said headlight, but said transmissions having substantially the same spectral center of gravity, either of said pair of filters being available at will to impart its characteristics to the headlight by being suitably placed before said headlight while the other filter is placed so as to be ineffective, providing each said plurality of automobiles with an observing element, said element including a pair of light filters having a different selective absorption, each member of the said pair of observing filters having a selective transmission including a certain selected portion of each respectively of certain red, orange, green and other selected colored signal lights of predetermined known spectral composition, the light of each said included spectral portion having substantially the same color as said signal light, the selective transmission of one member of the said pair of observing filters including also substantially all wave lengths included in the said selective transmission of a certain one of said pair of headlight filters, excluding substantially all light of wavelengths not included in a said portion respectively of each said signal light spectrum or in said certain headlight filter selective transmission, the selective transmission of the other member of said pair of observing filters likewise including a said portion of each said signal light spectrum, and also substantially all wavelengths included in a selective transmission of the other said headlight filter, excluding substantially all light of wavelengths not included in a said portion respectively of each signal light spectrum or in the said selective transmission of the said other headlight filter, either member of said pair of observing filters being capable of, at will, being suitably placed before the observer's eyes to be effective while the other filter is placed so as to be ineffective, whereby when any of said plurality of automobiles are so positioned as to oppose their headlights, the driver of each said opposed automobile may exclude the headlight glare of the opposing headlight while observing the road well illuminated and colored signal lights easily distinguishable, each said driver cooperating his said headlight character imparting element with his said observing element in suitable coordination, said cooperation being also coordinated with a similar cooperation of the said elements respectively of the opposing automobile.

17. The method of reducing glare from opposing headlights of two automobiles which includes the steps of providing a similar pair of differing selective absorption filters for each headlight of each automobile, the respective selective transmissions of the members of each said pair of filters being coordinated with the spectral composition of their respective headlight and with the spectral composition of the other member of the pair, each member of a pair having substantially the same co-efficient of absorption, the selective absorption of each said filter being substantially the same throughout its area, each said filter when placed exclusively before its headlight restricting said headlight to a known predetermined spectral composition having substantially the same spectral center of gravity, and the same hue and brightness, as the said headlight when restricted exclusively by the other member of the pair, each member of a pair transmitting a spectral composition consisting of bright bands separated by a dark band, the bright bands of each said composition occupying a spectral position included in the dark bands of the other said composition, coordinating the candle power of each headlight with the coefficient of absorption of said filters, the said headlights of said restricted spectral composition having a predetermined candle power, the selective transmission of said filters being also coordinated with the known predetermined spectra respectively of red, yellow, green and any other selected color signal lights, each member of all said pairs of filters transmitting a selected portion of the said spectral compositions of each of a certain selected number of said colored signal lights, the light of the said portion included by each member of a pair from each said selected signal light having, when isolated, substantially the color of said signal light, providing the drivers respectively of each said automobile with a similar pair of differing observing filters, each said filter having substantially the same selective absorption, respectively selective transmission, throughout its area, said observing filters being coordinated with said headlight filters, one member of each said pair of observing filters transmitting freely light of wave lengths transmitted, as described, by one member of each said pair of differing headlight filters, while excluding substantially all light transmitted by the other member of each said pair of differing headlight filters, the other member of each said pair of observing filters being similarly coordinated with the other member of each said pair of differing headlight filters, each member of each said pair of observing filters having a selective transmission substantially completely different from that of the other member, whereby each said driver is provided with a choice of headlight filters and a choice of observing filters, the selective transmission of each of all said filters in both automobiles having substantially the same spectral center of gravity, said choices being available at will independently to the drivers respectively of each said automobile, the driver of one said automobile placing before his headlight a certain chosen similar member of the paired headlight filters, simultaneously placing before his eyes the member of his pair of observed filters which transmits the same spectral composition as his said chosen headlight filter, the driver of the other said automobile placing before his headlights that member of his pair of headlight filters which has the opposite characteristics, and placing before his eyes the corresponding filter which transmits the same spectral composition as his headlight filter, whereby the said drivers of each automobile each observe the road fully illuminated by his own headlight, while the glare of the opposing headlights of the other automobile is excluded, the driver of each automobile observing the said signal lights substantially unchanged in color, each driver observing other opposing headlights having an ordinary continuous spectrum of substantially the same center of gravity as said restricted headlights, as substantially unchanged in hue, but with their brightness materially reduced.

18. The method of producing an effect in radiation which includes the steps of projecting from opposing directions radiation having an objective spectral difference but the same spectral center of gravity, and restricting, by means of a suitable selective element, the radiation reaching a certain receiving element to wave lengths comprised only by the radiation it is desired to utilize by means of that certain receiving element, said wave lengths being comprised also only in a chosen one of the said objectively different radiations.

19. The method of producing a light effect which includes the steps of projecting a plurality of images upon a scene respectively from opposing directions, by light respectively having an objective difference of spectral composition but the same hue and the same spectral center of gravity, and restricting, by means of a suitable selective element, the light reaching the eye to light substantially of the composition of a selected one of said images.

20. The method of producing a light effect which includes the steps of projecting light from opposing directions upon a scene, the light projected from opposing directions having an objective difference of spectral composition but the same hue and the same spectral center of gravity, said scene including a certain color of a known predetermined spectral composition, the composition of the said certain color being coordinated with the spectral compositions respectively of the opposing lights, the latter respectively including portions of the said spectrum of the said certain color having respectively a different subjective effect, whereby the objective difference of opposing light is revealed by means of a subjective difference of said certain color.

21. The method of improving visibility in a scene wherein is an opposing light having a spectral composition including bright bands separated by a dark band, which includes the steps of illuminating the scene by light having substantially the same spectral center of gravity and hue as the said opposing light, and having a spectral composition likewise including bright bands separated by a dark band, but having an objective spectral difference from the composition of the opposing light, the bright spectral bands occupying substantially the position of the dark spectral bands of the opposing light, and restricting, by means of a suitable filter, the light reaching the eye substantially to the said composition having an objective difference from that of the said opposing light.

In testimony whereof, I affix my signature.

WILLIAM J. WHITING.